Jan. 28, 1958 — A. P. GIRAITIS — 2,821,560
PREPARATION OF HALOGENATED COMPOUNDS
Filed May 27, 1953 — 2 Sheets-Sheet 1

ALBERT P. GIRAITIS
INVENTOR.

BY
Kenneth Swarthwood

Jan. 28, 1958  A. P. GIRAITIS  2,821,560
PREPARATION OF HALOGENATED COMPOUNDS
Filed May 27, 1953  2 Sheets-Sheet 2

ALBERT P. GIRAITIS
INVENTOR.

BY
Kenneth Swartwood

United States Patent Office 2,821,560
Patented Jan. 28, 1958

2,821,560

PREPARATION OF HALOGENATED COMPOUNDS

Albert P. Giraitis, Baton Rouge, La., assignor to Ethyl Corporation, New York, N. Y., a corporation of Delaware Application May 27, 1953, Serial No. 357,860

2 Claims. (Cl. 260—659)

This invention relates to a process for preparing halogenated compounds, particularly those having up to four carbon atoms per molecule. This application is a continuation-in-part of my co-pending application Serial No. 208,527, filed January 30, 1951, now Patent No. 2,698,347, granted December 28, 1954.

In this parent application there is disclosed and claimed a process for preparing haloalkanes and related compounds as by reacting a corresponding less halogenated alkane with sulfur trioxide and a metal salt of the halogen atoms to be substituted in this alkane, the reaction being effected at elevated temperatures.

More specifically the process, as described in that application, includes treating in a reaction zone solid metal halide selected from the class consisting of alkali metal chlorides, alkali metal bromides, alkaline earth metal chlorides, and alkaline earth metal bromides with a saturated hydrocarbon, at a temperature of from 250° to 450° C., in the presence of sulfur trioxide, the sulfur trioxide being in the proportion of from about 0.5 mole to 8 moles to 1 mole of the hydrocarbon; separately withdrawing a gaseous product stream and a non-gaseous product stream from the reaction zone, the gaseous product stream comprising halogenated hydrocarbon, sulfur dioxide, and hydrogen halide, and the non-gaseous stream comprising metal sulfate; and recovering the halogenated hydrocarbon from the gaseous product stream.

Among the objects of the present invention is the modification of the above process so that it gives improved results.

Figure 1:
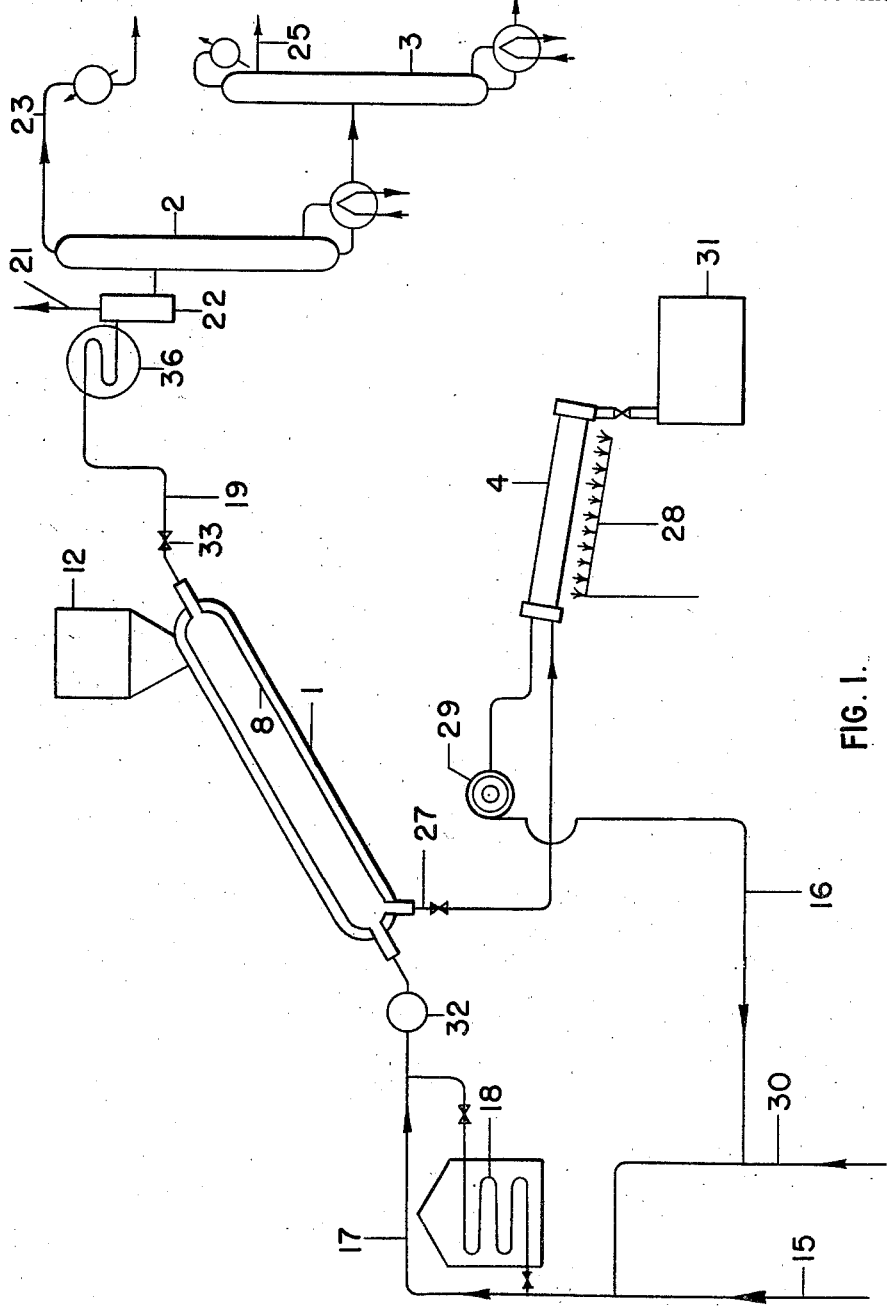
Figure 2:
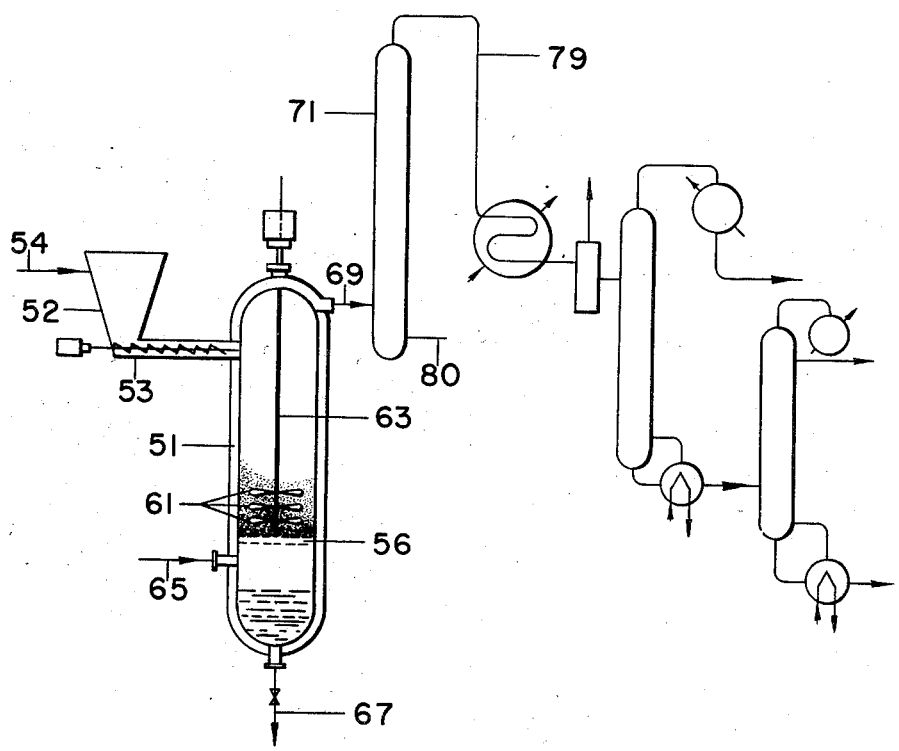

The above as well as additional objects of the present invention will be more clearly understood from the following description of several of its exemplifications, reference being made to the accompanying drawings in which:

Figure 1 illustrates one type of apparatus for carrying out the process of the present invention; and Figure 2 shows another apparatus for carrying out a modified process according to the present invention.

It has been discovered that the halogenation process described in the above-identified parent application produces better yields when at least the gaseous effluent of the reaction is contacted with a mercury, iron or copper compound. The entire reaction mixture can be so contacted by mixing with the metal halide reactant at least about one-tenth percent by weight of the above compound or compounds. Examples of such compounds are mercuric chloride, mercurous chloride, mercuric oxide, mercuric bromide, mercuric acetate, mercuric chromate, mercuric fluoride, mercuric nitrate, mercurous nitrate, mercurous cyanide, mercurous sulfate, mercuric sulfide, diphenyl mercury, cupric oxide, cuprous cyanide, cupric chloride, cuprous chloride, cuprous bromide, cupric acetate, cuprous oxide, cuprous ferricyanide, cupric fluoride, cupric palmitate, cuprous thiocyanate, cupric sulfide, tri-copperphosphide ($Cu_3P$), ferric oxide, ferric chloride, ferric bromide, ferric acetate, ferric nitrate, ferric sulfate, ferrous oxide, ferrous fluoride, ferrous sulfate, ferrous ammonium sulfate, ferrous sulfide and ferrous cyanide.

Referring to Figure 1, the materials to be reacted are charged to a reactor 1. Gaseous products are condensed and separated in a recovery system including the fractionating columns 2 and 3, and a by-product stream is treated in a recovery system including a heated kiln 4.

The reactor 1 is an inclined cylindrical vessel preferably provided with a refractory lining 8 because of the corrosive nature of the reacting components. A heating means (not shown) can be supplied to initially bring the reactor contents to the reaction temperature. Ordinarily the heat provided by the exothermic reaction is sufficient to maintain the desired reaction temperature once it has been reached.

A supply of salt (sodium chloride) is maintained in an enclosed charging hopper 12, which discharges the salt feed to the reactor 1. An inert gas, such as nitrogen, is advisedly kept under pressure in the hopper 12 to reduce the penetration of reaction gases into the hopper, thereby assuring that no reaction will occur within the salt supply system. To this end the feeding is also preferably effected through a gas lock.

The gaseous feeds to the system, sulfur trioxide and the organic material to be halogenated (ethane, for example) are received through lines 30 and 15, respectively. The fresh sulfur trioxide is combined with a recovered stream of sulfur trioxide recycled in line 16. The sulfur trioxide and organic compound are combined in line 17 and can be fed directly to the reactor, or, if necessary, can be preheated to reaction temperature by passage through a heating coil 18. A pump 32 can be provided in the feed line or lines to build up the pressure in the reaction where this is desired.

In the reactor, the sulfur trioxide and gaseous organic material contact the salt bed and react apparently immediately and extremely rapidly. The reaction converts the salt to a mixture of sulfates which is liquid at the preferred operating temperature and drains down into an outlet line 27. The gaseous product of the reaction pass upwardly and are discharged from the reactor through line 19 to the recovery section.

The precise arrangement of the recovery system for the gaseous reaction products will, of course, vary with the halogenated organic materials produced and their volatility with respect to the sulfur dioxide also generated in the reaction. The recovery system is intended for processing and recovery of halogenated organics such as ethyl chloride, which are less volatile than sulfur dioxide. The volatile products are cooled in condenser 36 to a temperature sufficiently low to liquefy virtually all the halogenated products as well as accompanying sulfur oxides. Non-condensible waste diluents are vented through line 21 from a disengaging chamber 22. The condensate stream from condenser 36 is then fed to column 2 which distills the sulfur dioxide from the halogenated compounds, the sulfur dioxide being discharged through line 23. The sulfur dioxide can be reoxidized to sulfur trioxide by conventional means, thereby providing high overall materials utilization for the process.

The bottoms from fractionator 2, comprising primarily halogenated organics, are fed to fractionator 3, the purified major product being usually discharged as an overhead product through line 25. The bottoms stream from fractionator 3 usually comprises the by-product halogenated compounds containing a higher halogen content than the principal product.

The liquid reaction products draining into line 27 will vary in composition according to the proportions of reactants and the conditions of reaction. In the preferred mode of operating the liquid products can be regarded as a loose chemical combination of a sulfate plus one or more additional molecules of sulfur trioxide combined with the sulfate in the same manner as water of hydration. Such materials have the advantage that they can be pumped and transferred as liquids or can be utilized as produced without further processing. If the uncombined sulfate, such as sodium sulfate, is desired, the excess sulfur trioxide can be driven off and recovered by heating the product mixture. This is conveniently effected by feeding the liquid sulfate through line 27 to rotating kiln 4, which is externally heated by burner assembly 28 to an elevated temperature of the order of 500° C. An exhauster 29 removes the sulfur trioxide released in the kiln and transfers it through line 16 for the combination with fresh sulfur trioxide and reuse in the process. The metal sulfate discharged from kiln 4, freed of the excess sulfur trioxide, is collected in an enclosed and removable storage bin 31.

According to the present invention the reactor 1 may have its inner surface coated or lined with a mercury or copper compound of the type indicated above, or the chloride feed can contain a small amount, 0.1 to 3 percent by weight, of such a compound. Under these conditions the yield of halogenated product based on inorganic chloride input is at least about 15 percent higher than when these catalysts are not present. The largest increases are obtained when the reaction is carried out at super-atmospheric pressures. Thus, at 3 atmospheres the yield increases run about 30 percent or higher. Where super-atmospheric pressures are used, a pressure-reducing valve 33 in the gas effluent line as well as a similar valve in the liquid drain line 27 can be used to confine the increased pressure to the reactor. If desired, however, all or part of the gas recovery system as well as the liquid treatment unit can be operated at an increased pressure. In general, smaller reactors can be used with the present invention to provide any desired output.

In use, the reactor of the apparatus of Figure 1 receives inorganic halide feed from loader 12, either continuously or intermittently. The halide liquefies as the reaction proceeds and runs down the inner wall of the reactor leaving unmelted material collected as solids that stay more or less in place till they melt. Some of the solids tend to be washed down with the liquefied material, and the catalysts may also be entrained or dissolved in the drainings, particularly if the catalyst compounds are in finely divided form.

Where such entrainment or dissolution takes place the catalyst losses from the reactor should be made up as by the addition of fresh or reclaimed catalyst to the inorganic halide feed. Mercury compounds are readily reclaimed inasmuch as they are decomposed in kiln 4, giving off mercury vapors which condense out where the vapor line becomes sufficiently cool. The condensed mercury can then be oxidized into oxide form or converted into chloride for return to the reactor 1. When iron or copper salts are used as catalysts they will be found dissolved or entrained in the inorganic product melt and usually are converted to sulfate-type salts therein. These materials can be recovered from the inorganic product melt or discarded.

Instead of mixing the catalyst compound with the inorganic halide, it can be used merely as a reactor surface contact material, as by making the reactor lining 8 porous and impregnating it with a solution of the catalyst compound. Alternately the lining can carry a coating of the catalyst compound fused in place or cemented in place in block form.

A specific example of the invention carried out on the apparatus of Figure 1 is as follows:

*Example I*

Gaseous ethane and $SO_3$ are fed together under pressure in the ratio of 25 parts ethane to 75 parts $SO_3$ by volume to the reactor after it had been charged with sodium chloride containing 0.5 percent by weight of mercurous chloride, heated to 290° C. and maintaining under a pressure of three atmospheres. From the gaseous reaction products there was recovered small amounts of hydrogen chloride, along with the principal yield of ethyl chloride, some dichloroethanes, sulfur dioxide and unreacted ethane.

The reaction proceeds very smoothly and the liquefied reaction products are recovered as indicated in the parent application, but with a yield about 28 percent larger. The reaction is effectively carried out at temperatures from about 240° C. to about 450° C.

Calcium chloride can be substituted for all or part of the sodium chloride feed. Where more than about 10 percent of such substitution is made, however, the non-liquefied calcium sulfate formed by the reaction accumulates in the reactor and requires emptying. A screw conveyor extending longitudinally through the reactor is suitable for this purpose. Less $SO_3$ can be used with calcium chloride or other inorganic halide that is converted to a sulfate which does not form an addition product with $SO_3$. Other alkali metal, alkaline earth metal and in fact any inorganic halide can also be used.

The above-described advantages of the process of the present invention are also obtainable with bromination. Thus when an inorganic bromide such as sodium bromide or calcium bromide is substituted for the sodium chloride, a similarly increased yield of brominated product is produced.

Methane, methyl chloride, methyl bromide, methyl fluoride, methyl iodide, the corresponding methylene halides and trihalomethanes whether the halogens are the same or different, ethyl halides, ethylene and ethylidene halides, tri-, tetra- and penta-halo ethanes as well as the unhalogenated and incompletely halogenated propanes and butanes all have their halogenation improved in accordance with the present invention. Other compounds such as alkanoic acids, as disclosed in the parent application are also halogenated better with the catalyst of the present invention.

Figure 2 shows a modified technique for carrying out the halogenation of the present invention. Here the reaction is effectively carried out in two stages, the first being in a reactor 51 as in the parent application. Inorganic halide free of catalyst is added by means of hopper 52 and screw conveyer 53, using a protective stream of inert gas shown introduced through line 54.

A perforated plate 56 catches the halide feed and holds it in a reaction zone where it can be agitated by the blades 61 carried by a suitably rotated agitating shaft 63. Below the plate, the gaseous reactants are introduced through line 65, and the liquefied products draining through the plate are discharged by way of line 67.

The gaseous products of the first stage are withdrawn through conduit 69 and passed through a second reactor 71 which is packed with catalyst compound, with or without a carrier such as Raschig rings, broken tile or the like. Additional sulfur trioxide is introduced into the second reactor 71 through line 80. The second reactor is preferably kept at a temperature equal to or higher than that of the first reactor. A temperature of about 240 to about 450° C. is suitable and causes additional halogenation to take place in reactor 71.

The gaseous products from reactor 71 are led through line 79 to a condensing and fractionating assembly as in the construction of Figure 1 as well as in the parent application.

The second reactor can advantageously be operated at elevated pressure as by inserting a pump in line 69 and a pressure reducing outflow valve in line 79. Such elevated pressures are apparently of very little benefit if applied to the first reactor unless a catalyst compound is also present there.

The following example illustrates one load of operation when using an apparatus of the type illustrated by Figure 2.

Example II

A mixture of 25 parts of gaseous ethane and 75 parts of sulfur trioxide is fed into the first reactor which is charged with sodium chloride free of catalyst, the reactor being heated to 300° C. The mixture of gases passes through the chloride bed in which initial reaction takes place. The hot effluent gases from the top of the first reactor, which are composed mainly of ethyl chloride, hydrogen chloride, sulfur dioxide, and unreacted ethane, are pressurized into the second reactor packed with broken tile impregnated with mercurous chloride. Additional sulfur trioxide (50 parts) is fed under pressure into the bottom of the second reactor. The exothermic reaction taking place along with the pressure applied causes the temperature to rise to 350° C. The temperature is maintained at 350° C. by regulation of the pumping rates and the take-off rate, pressure being held at three atmospheres. The product mixture from the top of the second reactor is composed of ethyl chloride and smaller amounts of higher chlorinated ethanes and sulfur dioxide, some unreacted ethane, and small quantities of hydrogen chloride.

A comparison of analyses of the gas streams from the first and second reactors shows an increase in yield of 29% by contacting the hot gases from the first reactor and additional sulfur trioxide with the catalyst in the second reactor.

As many apparently widely different embodiments of this invention may be made without departing from the spirit and scope hereof, it is to be understood that the invention is not limited to the specific embodiments hereof except as defined in the appended claims. For example, when the desired product is methyl chloride or other compounds more volatile than sulfur dioxide, the final fractionation is modified as by recovering the halogenated organic product from the first overhead line 23 and separating out the sulfur dioxide from line 25.

I claim:

1. A process of producing halogenated alkanes and metal sulfates, comprising treating in a reaction zone solid metal halide selected from the class consisting of alkali metal chlorides, alkali metal bromides, alkaline earth metal chlorides, and alkaline earth metal bromides with a less halogenated alkane having up to 4 carbon atoms per molecule at a temperature of from 250° to 450° C., in the presence of sulfur trioxide and a catalytic amount of a compound selected from the class consisting of mercuric chloride, mercurous chloride, mercuric oxide, mercuric bromide, mercuric acetate, mercuric chromate, mercuric fluoride, mercuric nitrate, mercurous nitrate, mercurous cyanide, mercurous sulfate, mercuric sulfide, diphenyl mercury, cupric oxide, cuprous cyanide, cupric chloride, cuprous chloride, cuprous bromide, cupric acetate, cuprous oxide, cuprous ferricyanide, cupric fluoride, cupric palmitate, cuprous thiocyanate, cupric sulfide, tricopperphosphide ($Cu_3P$), ferric oxide, ferric chloride, ferric bromide, ferric acetate, ferric nitrate, ferric sulfate, ferrous oxide, ferrous fluoride, ferrous sulfate, ferrous ammonium sulfate, ferrous sulfide and ferrous cyanide, the sulfur trioxide being in the proportion of from about 0.5 mole to 8 moles to 1 mole of the alkane; separately withdrawing a gaseous product stream and a non-gaseous product stream from the reaction zone, the gaseous product stream comprising halogenated alkane, sulfur dioxide, and hydrogen halide, and the non-gaseous stream comprising metal sulfate; and recovering the halogenated alkane from the gaseous product stream.

2. A method of producing chloroethane comprising reacting sulfur trioxide and ethane with a mixture of sodium chloride and about 2 to 3 percent of mercury chloride, the mole ratio of sulfur trioxide to ethane being from 0.5:1 to 8:1, the reaction being effected at a temperature of from 240° C. to 450° C. and at a pressure of at least 3 atmospheres separately collecting gaseous effluent and liquid sodium sulfates formed by the reaction, and recovering chloroethane from the gaseous effluent.

References Cited in the file of this patent

UNITED STATES PATENTS

| | | |
|---|---|---|
| 1,242,208 | Lacy | Oct. 9, 1917 |
| 2,259,248 | Iler | Oct. 14, 1941 |
| 2,431,880 | Merz | Dec. 2, 1947 |
| 2,698,347 | Giraitis | Dec. 28, 1954 |
| 2,698,348 | Giraitis | Dec. 28, 1954 |

OTHER REFERENCES

Groggins: "Unit Processes in Organic Synthesis," third edition, page 193 (1947).